April 15, 1941.                D. W. HUDSON                2,238,325
TIRE CHAIN TOOL
Filed Feb. 15, 1937

INVENTOR
David W. Hudson
BY
Wheeler, Wheeler and Wheeler
ATTORNEYS

Patented Apr. 15, 1941

2,238,325

UNITED STATES PATENT OFFICE 2,238,325

TIRE CHAIN TOOL

David W. Hudson, Green Bay, Wis.

Application February 15, 1937, Serial No. 125,692

5 Claims. (Cl. 81—15.8)

This invention relates to a tire chain tool.

It is the object of the invention to provide a tool for facilitating the application of tire chains to automobile tires and the like. The invention is particularly useful in the application of that type of tire chain which consists of a tire encircling element applied individually at any given point of the casing. It has heretofore been very difficult, particularly in the restricted space available for the wheel of a modern car, to work the chain (or the fabric strap attaching portion thereof) around the casing and through the small opening between the spokes of the wheel in order that it may be connected about the felloe, rim, and casing to function in the intended manner.

Other objects of the present invention will be apparent from the following disclosure.

In the drawing.

Like parts are designated by the same reference characters throughout the several views.

In its simplest form my improved tool comprises a strap or band of resiliently elastic material having a peripheral length sufficient to encircle or substantially encircle the portion of the wheel and casing to which the chain is to be applied.

The body portion of the tool will have tire chain engaging means at one of its ends.

Figure 3:
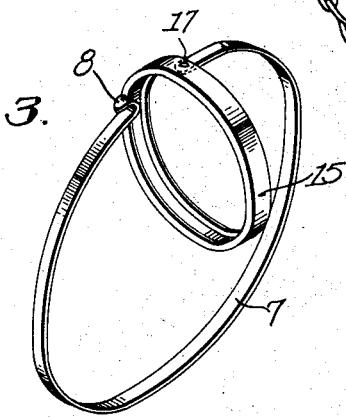
Figure 3 is an enlarged detail view showing a preferred form of the tool in perspective as it appears when open and ready for use.

I prefer that the tool comprise a body portion 7 of spring band stock, such as that used in a clock spring. This body portion will have an inherent bias such that it will tend normally to assume a circular form as shown in Fig. 3. At its end it will have a hook 8 which may be integrally or otherwise formed. As an alternative, it may have a head portion 9 with a slot 10 or any other device for receiving the strap 11 of the tire chain device 12.

Figure 1:
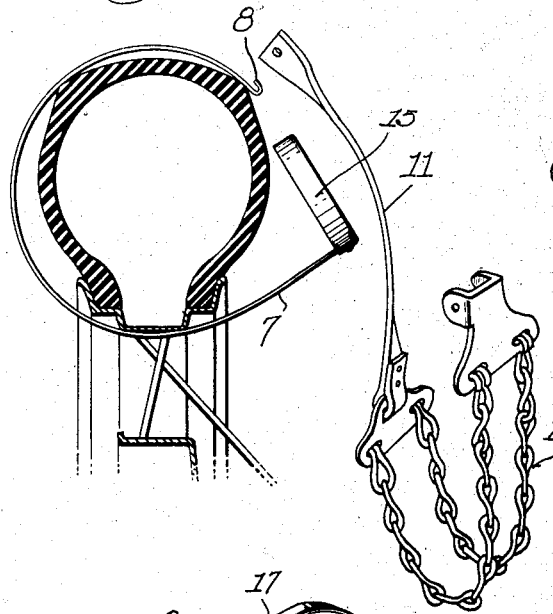
Figure 1 is a detail view showing the wheel and casing in section and illustrating in side elevation the use of my improved tool for drawing the tire "chain" around the tire.

In the use of the device, the normally annular body portion 7 is partialy straightened out and its hooked terminal portion 8 is inserted through the wheel. The partially straightened body portion is then fed through the wheel to cause the hooked leading end thereof to follow in a generally circular path about the rear side of the casing and across the top of the casing to the front side of the case as shown in Figure 1.

Figure 2:
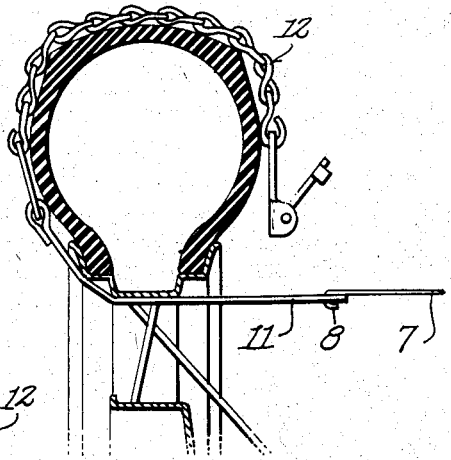
Figure 2 shows the chain in place as the result of the use of the tool.

The end of the strap or other connector of the tire chain device is now secured to the hook of the tool and the tool is pulled back upon the same path upon which it was introduced, thereby drawing the strap portion 11 of the tire chain device about the tire and between the spokes of the wheel to the point shown in Figure 2 where the two ends of the tire chain device may be connected, the tool having first been removed.

Figure 4:
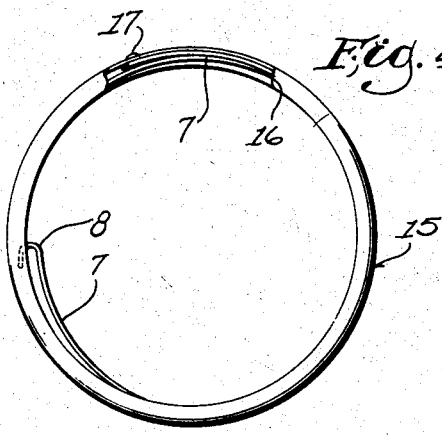
Figure 4 is a view in side elevation showing the tool rolled up and housed within a case which may be attached to the tool as a handle therefor.

For convenience in handling and transporting the tool, I have devised a simple case 15 which comprises an annulus of channeled form in cross section, one side of the channel being preferably cut away at 16 in Figure 4 to expose the convolutions of the body portion 7 of the tool. When the said body portion is tightly wound, it may readily be introduced into the annulus and its expansion will cause it to position itself within the channel thereof until it is desired to withdraw the tool for use. I prefer that the tool be pivoted permanently to the annulus as shown at 17. By constricting the tool slightly in the manner of winding up a clock spring, it is possible to withdraw its length from the annulus and to pivot the entire tool upon the rivet 17 so that the tool will assume the position indicated in Figures 1 and 3 with reference to the annulus, leaving the tool exposed for use while the annulus serves as a handle therefor and, incidentally, prevents the entire tool from inadvertently being allowed to pass through the spokes of the wheel.

Figure 5:
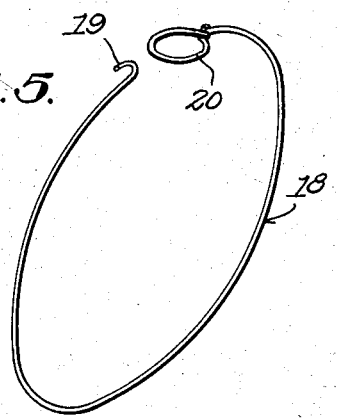
Figure 5 shows in perspective a modified embodiment of the invention.
Figure 6:
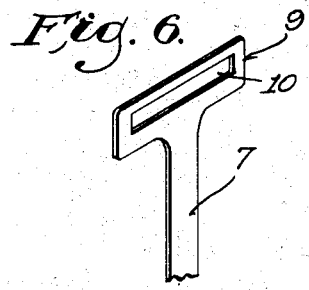
Figure 6 shows in perspective a fragmentary detail on an enlarged scale of a modified terminal portion for a tool of either type.

In the construction shown in Figure 5, I have shown the body portion 18 of the tool comprising a single strand of piano wire formed integrally to provide the hook 19 at one end thereof and a handle ring 20 at the opposite end. This form of the tool is used in the same manner that has already been described, being fed around the tire to a position where the strap 11 may be hooked thereon, after which the tool is withdrawn to pull the strap and tire chain into place about the tire.

I claim:

1. A tool of the character described comprising the combination with a split ring of spring stock having a chain connector adjacent one end, of means for maintaining said split ring coiled in a diameter smaller than the diameter which said ring normally tends to assume, said means comprising a channeled annulus pivoted to the end of said ring opposite the end which is provided with said connector.

2. A tool of the character described comprising the combination with a split ring of spring stock having a chain connector adjacent one end, of means for maintaining said split ring coiled in a diameter smaller than the diameter which said ring normally tends to assume, said means comprising a channeled annulus pivoted to the end of said ring opposite the end which is provided with said connector, one wall of said channel being broken away to permit said ring to be swung on its pivot with reference to said annulus.

3. A tool of the character described, comprising the combination with a split ring of spring stock adapted to be spirally coiled and having a chain connector adjacent that end which is innermost when said ring is spirally coiled, of an annular retainer permanently connected to that end of the split ring which is outermost when said ring is spirally coiled, said retainer having a diameter and form adapted to hold the ring in the plane of the retainer and being smaller than the expanded diameter of the ring for maintaining said split ring coiled in a diameter smaller than the diameter which said ring normally tends to assume, said retainer constituting a handle for the manipulation of said ring.

4. A tool of the character described, comprising the combination with a split ring of spring stock adapted to be helically coiled within a diameter smaller than the diameter which said ring normally tends to assume, of a chain connector on said ring adjacent that end thereof which is innermost in the helically coiled position of said ring, and a handle connected to that end of said ring which is outermost in the helically coiled position thereof, said handle including a restricting means for maintaining said split ring coiled in a diameter smaller than the diameter which said ring normally tends to assume, and a laterally confining means for maintaining successive coils of said ring superimposed.

5. A tool of the character described, comprising a handle of circuitous form and channeled cross section in combination with a split ring adapted to be helically coiled in said handle for storage, and means pivotally connecting to said handle that end of the split ring which is outermost when said split ring is coiled, the innermost end of said split ring being provided with coupling means and said handle being adapted to be turned upon said pivotal connection to a position transverse with respect to the portion of the ring with which the handle is connected.

DAVID W. HUDSON.